United States Patent [19]

Mazziotti

[11] Patent Number: 4,505,689

[45] Date of Patent: Mar. 19, 1985

[54] MOUNTING FOR A BEARING CUP OF A UNIVERSAL JOINT

[75] Inventor: Philip J. Mazziotti, Toledo, Ohio

[73] Assignee: The Zeller Corporation, Defiance, Ohio

[21] Appl. No.: 463,651

[22] Filed: Feb. 3, 1983

[51] Int. Cl.³ .............................................. F16D 3/26
[52] U.S. Cl. .................................................... 464/130
[58] Field of Search ............... 464/128, 130, 132, 134, 464/905; 308/236, 207 R

[56] References Cited

U.S. PATENT DOCUMENTS

| | | | |
|---|---|---|---|
| 1,552,358 | 9/1925 | Thiemer | 464/132 X |
| 1,671,682 | 5/1928 | Norris | 308/236 X |
| 1,941,764 | 1/1934 | Swenson | 464/130 |
| 1,989,832 | 2/1935 | Swenson | 464/130 |
| 2,773,368 | 12/1956 | Slaght | 464/130 |
| 2,869,341 | 1/1959 | Gnambs | 464/130 |
| 3,606,566 | 9/1971 | Bethke | 308/4 R X |
| 3,824,808 | 7/1974 | Mangiavacchi | 464/130 X |
| 4,047,396 | 9/1977 | McElwain et al. | 464/130 X |

Primary Examiner—Stuart S. Levy
Assistant Examiner—Thomas R. Hannon
Attorney, Agent, or Firm—Allen D. Gutchess, Jr.

[57] ABSTRACT

A mounting is provided for a bearing cup located in a yoke arm of a universal joint. The mounting includes at least two diametrically-opposite recessed locating surfaces on the closed end of the bearing cup. Threaded fasteners are engaged in threaded holes in the yoke arm on diametrically-opposite sides of a bore therein in which a bearing cup is to be located. Annular locating surfaces below the heads of the fasteners and either separate from or integral therewith are also provided. These engage the recessed locating surfaces on the bearing cup and also locating surfaces on the yoke arm, the latter surfaces either surrounding the bore or positioned on opposite sides of the bore around the threaded holes. The mounting can be in kit form to replace bearing cups of an existing universal joint. In this instance, the replacement kit includes a bearing cup with the recessed locating surfaces, two threaded fasteners, and two of the annular locating surfaces for each yoke arm.

13 Claims, 4 Drawing Figures

MOUNTING FOR A BEARING CUP OF A UNIVERSAL JOINT

This invention relates to a mounting for a bearing cup of a universal joint and more specifically to a bearing cup replacement kit embodying the mounting for replacing cups of existing universal joints.

Various mounting means are shown in U.S. patents, including Swenson, U.S. Pat. Nos. 1,989,832, issued Feb. 5, 1935; Gnambs, 2,869,341, issued Jan. 20, 1959; and Slaght, 2,773,368, issued Dec. 11, 1956.

Commercially, bearing cups, particularly for large universal joints, commonly have had stamped flanges welded on the closed ends of the cups. The flanges extended beyond the peripheries of the cups and had holes therein. Threaded fasteners, specifically machine screws, extended through the holes and threaded into threaded holes located in the yoke arm on diametrically-opposite sides of bores therein in which the bearing cups were received. The yoke arms had machined locating surfaces around the bores and the flanges likewise had machined locating surfaces on the portions extending beyond the peripheries of the cups to accurately locate the cups relative to the arms. While this mounting was generally satisfactory, it was also expensive because of the welding of the flanges to the cups and the machining of the flanges for the locating surfaces. The welding of the flanges could distort the flanges and also the cups to cause additional problems. Also, if the cups rusted and froze in the bore of the yoke arms, they were difficult to remove because the flanges had to be pried out from the yoke arms and it was difficult to insert a prying tool between the flanges and the arms, especially when working underneath the vehicle. The extracting procedure also could damage the locating surfaces on the yoke arms. Further, the mounting flanges added to the weight of the universal joint, a detriment, especially with the weight-conscious automobile industry today.

The bearing cup mounting in accordance with the invention has a number of advantages over those heretofore known. The bearing cup has recessed locating surfaces uniformly spaced around the periphery of the cup, being diametrically opposed when two such surfaces are employed. The locating surfaces are located in a common plane and terminate at the peripheral edge of the cup. The recessed surfaces have peripheries in the shape of part of a circumference of a circle having a predetermined radius, and extend less than 180°. The yoke arms have corresponding threaded holes in a locating surface or locating surfaces around the cup bore and uniformly spaced therearound. A fastener with a threaded shank is provided for each of the threaded holes and means forming an annular, planar surface around the threaded shank provides an additional locating surface which engages the locating surface of the arm and the recessed locating surface of the cup to accurately locate the cup relative to the yoke arm and to the opposite cup in the other arm. The annular surface means has a radius substantially equalling the radius of the corresponding recessed cup surface to fit closely therewith. In this manner, the annular means also is effective to prevent the cup from rotating relative to the arm. The annular locating means can be in the form of an annular retaining ring or washer, or can be in the form of a surface below the head of a shoulder bolt, hence being one piece with the threaded fastener or a separate piece.

This simplified bearing cup mounting in accordance with the invention has a number of advantages over those heretofore known. A bearing cup mounting flange is eliminated to eliminate the welding and machining processes required thereon and to reduce weight. With larger universal joints, when the bearing cup is to be replaced, the operation usually occurs under the vehicle, in less than ideal conditions. With the bearing cup mounting according to the invention, the bearing cup can be forced partly through the yoke arm toward the opposite one to break loose the cup from the arm, if rusted, for example. The cup also does not require a press fit in the arm since the mounting according to the invention both positions the cup relative to the yoke arm and the opposite cup and also prevents rotation of the cup.

With the recessed locating surfaces in the cup, the closed end of the cup can extend beyond the locating surface of the arm so that opposite cups can be placed farther apart. This enables a longer cross to be used, if desired, to increase the load capacity of the universal joint. In addition, with the round locating surface associated with the threaded fastener, it is impossible to assemble the locating surface means in an incorrect position relative to the cup and the yoke arm. If locating surfaces are also provided in the yoke arm only around the threaded holes, they can have circular peripheries and can be readily machined or otherwise formed. Besides eliminating the welding and substantial machining heretofore required for the bearing cup mountings, the bearing cup with recessed locating surfaces can be formed to eliminate machining entirely.

The bearing cup mounting can also be provided as a replacement kit to replace bearing cups of existing universal joints. The kit can include a replacement bearing cup with the recessed locating surfaces, two threaded fasteners, and two annular locating means for each of the universal joint yoke arms.

It is, therefore, a principal object of the invention to provide a simplified and low cost mounting for a bearing cup of a universal joint.

Another object of the invention is to provide a mounting for a bearing cup of a universal joint in which the bearing cup can be partially forced through the bore in the arm in which the cup to be replaced is located.

A further object of the invention is to provide a bearing cup mounting which enables the bearing cup to be precisely located relative to the yoke arm in which it is mounted and relative to an opposite bearing cup and also prevents rotation of the bearing cup in the yoke arm.

Still another object of the invention is to provide a bearing cup mounting in which a closed end of a bearing cup has recessed locating surfaces with peripheries in the shape of part of a circumference of a circle and an annular locating means associated with a threaded fastener cooperating with the recessed surface whereby the cup and locating means cannot be incorrectly assembled in a yoke arm.

Other objects and advantages of the invention will be apparent from the following detailed description of a preferred embodiment thereof, reference being made to the accompanying drawings, in which.

Figure 1:
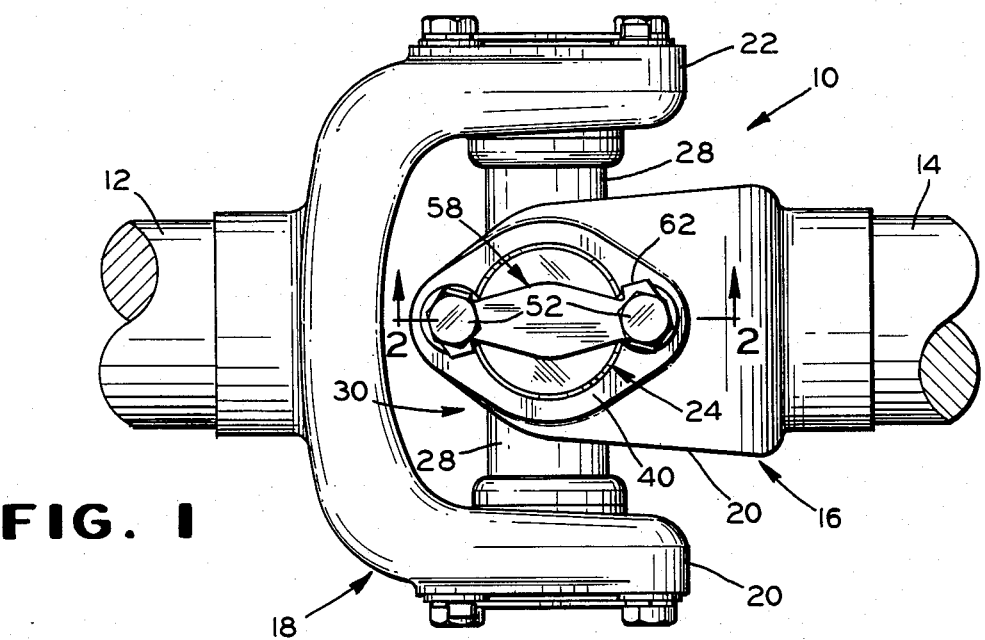
FIG. 1 is a side view in elevation of a universal joint embodying the invention.

Referring to the drawings, and particularly to FIG. 1, a universal joint embodying the invention is indicated at 10 and connects drive and driven members 12 and 14 in the usual manner. The universal joint 10 includes two yokes 16 and 18 disposed at mutually perpendicular angles, each having arms 20 and 22 holding bearing cups 24. The bearing cups 24 receive trunnions 26 (FIG. 2) which extend outwardly at mutually perpendicular angles from a body 28 of a cross 30. The cross can be of a conventional design and be provided with lubrication passages 32 which can communicate with a grease fitting (not shown) to supply lubricant to needle bearings 34 disposed between the cups and the trunnions. Suitable resilient seals 36 are located at the open ends 38 of the cups 24 to retain lubricant in the cups and to seal out water and contaminants.

Each of the yoke arms 20 and 22 has a generally elliptical locating surface 40 machined thereon and surrounding a bore 42 in which the cup 24 is received. Rather than the single locating surface surrounding the bore, for the bearing cup mounting in accordance with the invention, two smaller diametrically-opposite locating surfaces would be sufficent, or three or more locating surfaces could be uniformly spaced around the bore 42 for particular mountings.

Each of the yoke arms 20 also has threaded or tapped holes or recesses 44 in the locating surface 40. In most instances, two of the threaded holes 44 are located on diametrically-opposite sides of the bore 42, although three or more may be uniformly spaced around the bore 42 and at equal distances from the bore, for particular mountings. In any event, the locating surface 40 must encompass each of the threaded holes 44 to properly locate the cup 24 in the yoke arm 20 or 22.

Figure 2:
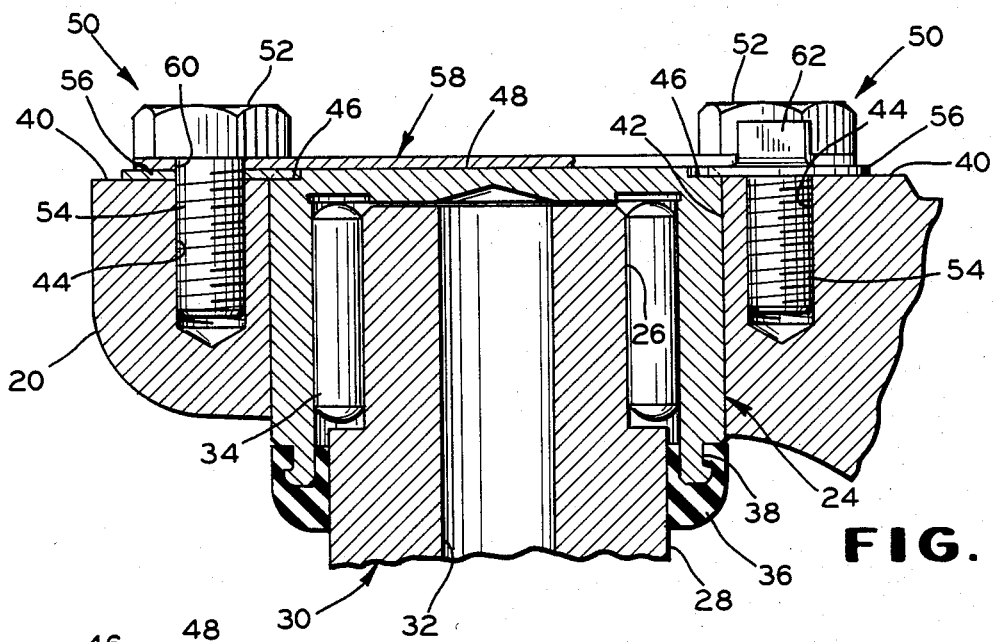
FIG. 2 is an enlarged view in cross section taken along the line 2—2 of FIG. 1.
Figure 3:
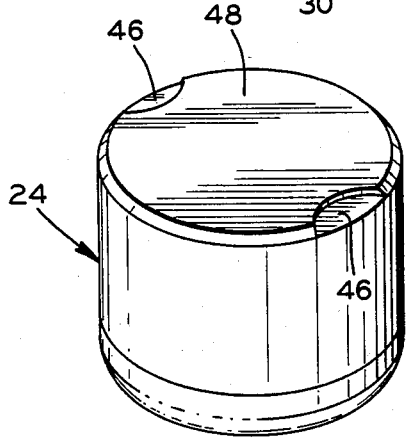
FIG. 3 is a view in perspective of a bearing cup in accordance with the invention.

The bearing cup mounting in accordance with the invention includes recessed locating surfaces 46 in a closed end 48 of the cup 24, as best shown in FIG. 3. Each of the recessed locating surfaces has a periphery in the shape of art of the circumference of a circle of predetermined radius with the periphery extending less than 180° and terminating at the edge of the cup. The recessed locating surfaces are uniformly spaced around the peripheral edge of of the closed end 48 of the cup 24 and are located in a common plane. Also, the recessed surfaces 46 preferably have maximum widths, in the direction of the radius of the cup, which do not exceed the thickness of the side wall of the cup, as shown in FIG. 2, so as not to extend over the inner end of the cup and weaken the end wall.

There is at least one of the cup locating surfaces 46 for each of the threaded holes 44. Where the holes 44 are diametrically-opposite across the bore 42, the recessed surfaces 46 are also diametriclly opposite. If three of the holes are employed, then three of the recessed surfaces 46 will be employed. A larger number of the recessed surfaces 46 can be employed around the peripheral edge of the closed end 48 of the cup 24, if desired, to more easily position the recesses relative to the threaded holes 44. If three of the threaded holes are employed, then six of the recessed surfaces 46 can be located around the cup. The bearing cup and the locating recesses can be formed therein without any further machining being required.

The bearing cup mounting further includes a threaded fastener 50 for each of the threaded holes 44. In this instance, the fasteners 50 are machine bolts having hex heads 52 and threaded shanks 54.

Means in the form of retaining rings or washers 56 form annular, planar locating surfaces around the threaded shanks 54 of the fasteners 50. The rings 56 have central holes receiving the threaded shanks 44 and have circular outer edges, the radii of which are substantially equal to the radii of the corresponding recessed cup surfaces 46, being slightly shorter. The lower locating surfaces of the rings 56 engage the locating surfaces 40 of the yoke arms 20 and 22 and also engage the recessed locating surfaces 46 of the cups 24 when the fasteners 50 are tightened in the threaded holes 44. In this manner, the cups 24 are located in a precise position relative to the yoke arms and also relative to the cups 24 in the opposite yoke arms.

The cooperation of the outer edge of the annular locating surface and the edge of the recessed cup surface also prevents possible rotation of the cup in the arm, which can wear an elliptical hole in the arm. Further, with the circular outer edge of the annular locating means, it is impossible to mount the locating means in an incorrect position on the threaded fastener relative to the cup and the yoke arm.

The recessed surfaces 46 are accurately formed relative to the inner ends of the bearing cups 24 to assure that the inner ends of the bearing cups in the opposite yoke arms are precisely located relative to one another so as to be precisely positioned relative to the ends of the trunnions 26 of the crosses 20. With the recessed locating surfaces 46 being coplanar with the yoke arm locating arm surfaces 40, the closed ends 48 of the cups 24 protrude slightly beyond the outer surface of the yoke arms. This enables the inner ends of the bearing cups to be spaced slightly farther apart than where the closed ends are flush with the yoke arm surfaces. Consequently, a cross with slightly longer trunnions can be employed to provide a greater load capacity for the universal joint, if desired.

Where the retaining rings 56 are used as the fastener locating surfaces, a locking plate 58 can be employed with the threaded fasteners 50. The locking plate 58 has end holes 60 which receive the threaded shanks 54 of the fasteners 50. After the fasteners are tightened, locking tabs 62 are bent upwardly along the flats of the heads 52 to prevent loosening of the fasteners.

Figure 4:
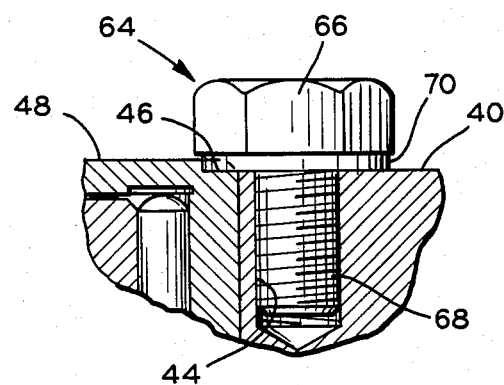
FIG. 4 is a fragmentary view in section of a slightly modified mounting for the bearing cup.

A slightly modified mounting is shown in FIG. 4. In this instance, shoulder bolts 64 are employed in place of the machine bolts 50, the bolts 64 having heads 66 and shanks 68. Means forming an annular, planar locating surface around the threaded shank of each of the fasteners is achieved here by a shoulder 70 which is structurally and functionally integral with the shoulder bolt 64. The shoulder 70 has the same diameter as the retaining ring 56 and functions in the same manner.

The bearing cup mounting in accordance with the invention has a number of advantages over those mountings heretofore known. The mounting is low in cost, not requiring machining for the locating surfaces 46 of the cups. Further, the locating surfaces 40 on the yoke arms can be easily machined where they are located only around the retaining rings 56 or the shoulders 70, such surfaces requiring radii about equal to or slightly larger than the radii of the recessed surfaces 46.

Futher, the threaded fasteners 50 are relatively inexpensive and the locking straps 58 where used, do not add a great deal to the cost of the mounting, and are also used in many other mountings.

Since none of the bearing cup mounting extends beyond the outer periphery of the bearing cup 24, when a bearing cup is to be replaced, it can be forced inwardly somewhat toward the opposite yoke arm to free the cup from the arm, particularly in the event some rust has occurred therebetween to freeze the cup in the arm. The bearing cup mounting also is relatively light in weight.

In addition, the new bearing cup mounting has other advantages over the bearing cups of original universal joints which the new cups and mountings can replace. The original cups required the large generally elliptical locating surface 40 on the yoke arm while only small locating surfaces around the threaded holes are needed for the new mounting. A mounting flange was welded to the closed end of the bearing cup and required machining of the surface extending beyond the cup to cooperate with the elliptical locating surface on the yoke arm. Further, the welding, beside requiring an additional step, could cause some distortion in the mounting flange and also possibly in the cup. Also, since the mounting flange extended beyond the periphery of the bearing cup, the cup could not be forced partly through the yoke arm toward the other cup to break it loose. Consequently, the mounting flange had to be pried away from the yoke arm locating surface which was often difficult and could result in a damaged locating surface on the arm. The mounting flange further added to the weight of the universal joint.

Where the bearing cup mounting is sold in a replacement kit form, the kit includes one of the bearing cups with the recessed surfaces, at least two threaded fasteners, an annular locating means for each of the fasteners, and a locking strap for each arm when the annular locating means is in the form of a retaining ring.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A universal joint comprising a yoke having a pair of spaced arms, each of said arms having a transverse bore aligned with the transverse bore of the other arm, said arms also having outer planar locating surfaces around the bores, located in a common plane, and terminating at the bores, with said locating surfaces on said spaced arms being spaced apart predetermined distances, said arms having threaded holes in the locating surfaces spaced uniformly around the bores, a flangeless bearing cup in each of said bores, said cup having a side wall of predetermined thickness, an open end, and a closed end with a substantially flat outer surface, the closed end of each of said bearing cups having recessed, outer locating surfaces spaced uniformly around a peripheral edge of the closed end of the cup and located in a common plane which is substantially parallel with the flat outer surface of said closed end of said cup, each of said recessed cup surfaces having a periphery in the shape of part of the circumference of a circle, extending less than 180°, and terminating at the peripheral edge of the cup, said threaded holes in the arm locating surfaces being spaced from and concentric with the periphery of the corresponding cup locating surfaces, said arm and cup locating surfaces being always positioned in a common plane for any circumferential position of said cup relative to said arm, a fastener with a threaded shank engaged in each of the threaded holes, and means forming an annular, planar locating surface around the threaded shank of each of said fasteners and engaging corresponding locating surfaces of the corresponding arm and cup to position the cup in a predetermined location relative to the yoke arm and to the opposite cup, and to prevent rotation of the cup in the arm, the radius of the outer edge of the annular surface substantially equalling the radius of the corresponding recessed cup surface.

2. A universal joint according to claim 1 characterized by said means forming the annular, planar surface being a separate retaining ring having a circular periphery and a central hole receiving the threaded shank of the corresponding fastener.

3. A universal joint according to claim 1 characterized by said means forming the annular, planar surface being formed by a shoulder on said fastener extending below a head of said fastener and being structurally integral therewith.

4. A universal joint comprising a yoke having a pair of spaced arms, each of said arms having a transverse bore aligned with the transverse bore of the other arm, each of said arms also having a planar locating surface surrounding said bore and terminating at said bore, with said locating surfaces on said spaced arms being spaced apart predetermined distances, a flangeless bearing cup in each of said bores, said cup having a closed end formed by an end wall of substantially predetermined thickness and having a flat outer surface, with the flat outer surface projecting beyond the planar locating surfaces of said arms a distance less than the thickness of the end wall, the closed end of each of said bearing cups having only two recessed locating surfaces in diametrically opposite positions on the cup and terminating at a peripheral edge of the cup, said recessed surfaces being located in a common plane and being recessed below the flat surface of the end wall a distance less than the thickness of the end wall, threaded holes in each of said arm locating surfaces and uniformly spaced around the bore and spaced apart predetermined distances, said holes being spaced outwardly from said cup, a fastener with a threaded shank engaged in each of said threaded holes, and means forming a planar locating surface around the threaded shank of each of said fasteners and engaging corresponding locating surfaces of the corresponding arm and cup to position the locating surfaces of the corresponding arm and cup in a common plane, to position the cup in a predetermined location relative to the yoke arm and to the cup in the opposite arm, and to prevent rotation of the cup relative to the yoke arm.

5. A universal joint according to claim 4 characterized by said means forming the planar surface around the shank being a separate retaining ring having a circular periphery and a central hole receiving the threaded shank of the corresponding fastener.

6. A universal joint according to claim 4 characterized by said means forming the planar surface around the shank being formed by a shoulder on said fastener extending below a head of said fastener and being structurally integral therewith.

7. A universal joint comprising a yoke having a pair of spaced arms, each of said arms having a transverse bore aligned with the transverse bore of the other arm, each of said arms also having a planar locating surface surrounding said bore and terminating at said bore, with said locating surfaces on said spaced arms being spaced apart predetermined distances, a bearing cup in each of said bores, said cup having a side wall of predetermined thickness, an open end, and a closed end with a substantially flat outer surface, the closed end of each of said bearing cups having recessed, diametrically-opposed, outer locating surfaces at peripheral edges of the cup and located in a common plane which is substantially parallel with the flat outer surface of said closed end of said cup, each of said cup recessed surfaces having a periphery in the shape of part of the circumference of a circle having a predetermined radius, extending less than 180°, and terminating at the edge of the cup, said cup being of cylindrical shape, each of said cup recessed surfaces having maximum width, as measured radially inwardly from the periphery of the cup, not exceeding the thickness of the side wall of the cup, threaded holes in the arm locating surfaces on diametrically-opposite sides of the bore and spaced from and concentric with the periphery of the corresponding cup recessed surfaces, a fastener with a threaded shank engaged in each of the threaded holes, and means forming an annular, planar, locating surface around the threaded shank of each of said fasteners and engaging corresponding locating surfaces of the corresponding arm and cup to position the cup in a predetermined position relative to the yoke arm and to the opposite cup, and to prevent rotation of the cup in the arm, the radius of the outer edge of the annular surface substantially equaling the radius of the corresponding recessed cup surface.

8. A universal joint according to claim 7 characterized by said means forming the annular, planar surface being a separate retaining ring having a circular periphery and a central hole receiving the threaded shank of the corresponding fastener.

9. A universal joint according to claim 7 characterized by said means forming the annular, planar surface being formed by a shoulder on said fastener extending below a head of said fastener and being structurally integral therewith.

10. A replacement cup assembly kit for a universal joint comprising a yoke having a pair of spaced arms, each of said arms having a transverse bore aligned with the transverse bore of the other arm, each of said arms also having at least one planar locating surface around said bore and terminating at said bore, with said locating surfaces on said spaced arms being spaced apart predetermined distances, said arms having threaded holes in the locating surfaces spaced uniformly around the bores, said replacement cup assembly kit comprising a flangeless bearing cup for each of said bores, said cup having a side wall of predetermined thickness, an open end, and a closed end with a substantially flat outer surface, the closed end of each of said bearing cups having at least two diametrically-opposite recessed locating surfaces terminating at a peripheral edge of the cup and located in a common plane which is substantially parallel with the flat outer surface of said closed end of said cup, each of said cup recessed surfaces having a periphery in the shape of part of the circumference of a circle having a predetermined radius, extending less than 180°, and terminating at the edge of the cup, said cup being of cylindrical shape, each of said cup recessed surfaces having a miximum width, measured radially inwardly from the periphery of the cup, not exceeding the thickness of the side wall of the cup, a fastener with a threaded shank for each of said threaded holes, and means forming an annular, planar surface around the threaded shank of each of said fasteners for engaging corresponding locating surfaces of the corresponding arm and cup to position the cup in a predetermined position relative to the yoke arm and to the opposite cup, and to prevent rotation of the cup in the arm, the radius of the outer edge of the annular surface substantially equalling the radius of the corresponding recessed cup surface.

11. A replacement cup assembly kit according to claim 10 characterized by said means forming the annular, planar surface being a separate retaining ring having two major annular surfaces which are substantially parallel and a circular periphery and a central hole receiving the threaded shank of the corresponding fastener.

12. A universal joint comprising a yoke having a pair of spaced arms, each of said arms having a transverse bore aligned with the transverse bore of the other arm, said arms also having outer planar locating surfaces around the bores, located in a common plane, and terminating at the bores, with said locating surfaces on said spaced arms being spaced apart predetermined distances, said arms having threaded holes in the locating surfaces spaced uniformly around the bores, a flangeless bearing cup in each of said bores, said cup having a side wall of predetermined thickness, an open end, and a closed end with a substantially flat outer surface, the closed end of each of said bearing cups having recessed, outer locating surfaces spaced uniformly around a peripheral edge of the closed end of the cup and located in a common plane which is substantially parallel with the flat outer surface of said closed end of said cup, each of said recessed cup surfaces having a periphery in the shape of part of the circumference of a circle, extending less than 180°, and terminating at the edge of the cup, said cup being of cylindrical shape, each of said recessed locating surfaces having a maximum width, as measured radially inwardly from the periphery of the cup, not exceeding the thickness of the side wall of the cup, said threaded holes in the arm locating surfaces being spaced from and concentric with the periphery of the corresponding cup locating surfaces, said arm and cup locating surfaces being positioned in a common plane, a fastener with a threaded shank engaged in each of the threaded holes, and means forming an annular, planar locating surface around the threaded shank of each of said fasteners and engaging corresponding locating surfaces of the corresponding arm and cup to position the cup in a predetermined location relative to the yoke arm and to the opposite cup, and to prevent rotation of the cup in the arm, the radius of the outer edge of the annular surface substantially equalling the radius of the corresponding recessed cup surface.

13. A universal joint comprising a yoke having a pair of spaced arms, each of said arms having a transverse bore aligned with the transverse bore of the outer arm, each of said arms also having a planar locating surface surrounding said bore and terminating at said bore, with said locating surfaces on said spaced arms being spaced apart predetermined distances, a flangeless bearing cup in each of said bores, said cup having a closed end formed by an end wall of substantially predetermined thickness and having a flat outer surface, with the flat outer surface projecting beyond the planar locating surfaces of said arms a distance less than the thickness of the end wall, the closed end of each of said bearing cups having at least two recessed locating surfaces uniformly positioned around the cup and terminating at a peripheral edge of the cup, said cup having a side wall of predetermined thickness, said cup being of cylindrical shape, each of said recessed locating surfaces having a maximum width, as measured radially inwardly from the periphery of the cup, not exceeding the thickness of the side wall of the cup, said recessed surfaces being located in a common plane and being recessed below the flat surface of the end wall a distance less than the thickness of the end wall, threaded holes in each of said arm locating surfaces and uniformly spaced around the bore and spaced apart predetermined distances, said holes being spaced outwardly from said cup, a fastener with a threaded shank engaged in each of said threaded holes, and means forming a planar locating surface around the threaded shank of each of said fasteners and engaging corresponding locating surfaces of the corresponding arm and cup to position the cup in a predetermined location relative to the yoke arm and to the cup in the opposite arm, and to prevent rotation of the cup relative to the yoke arm.

* * * * *

UNITED STATES PATENT OFFICE
CERTIFICATE OF CORRECTION

PATENT NO. : 4,505,689
DATED : March 19, 1985
INVENTOR(S) : Philip J. Mazziotti

It is certified that error appears in the above-identified patent and that said Letters Patent are hereby corrected as shown below:

Column 3, line 46, "art" should be --part--.

In the claims:

Claim 10, line 24, "miximum" should be --maximum--.

Signed and Sealed this

Sixteenth Day of July 1985

[SEAL]

Attest:

DONALD J. QUIGG

Attesting Officer     Acting Commissioner of Patents and Trademarks

UNITED STATES PATENT OFFICE
CERTIFICATE OF CORRECTION

Patent No. 4,505,689      Dated March 19, 1985

Inventor(s) Philip J. Mazziotti

It is certified that error appears in the above-identified patent and that said Letters Patent are hereby corrected as shown below:

Claim 13, line 3, "outer" should be --other--.

Signed and Sealed this

Eighth Day of December, 1987

Attest:

DONALD J. QUIGG

*Attesting Officer*      *Commissioner of Patents and Trademarks*